United States Patent [19]

Risse et al.

[11] 3,885,034

[45] May 20, 1975

[54] PHENOTHIAZINE DERIVATIVES IN THE TREATMENT OF PSYCHOTIC PERSONS

[75] Inventors: Klaus Heinz Risse; Ulrich Hörlein; Wolfgang Wirth, all of Wuppertal-Elberfeld, Germany

[73] Assignee: Bayer Aktiengesellschaft, Leverkusen, Germany

[22] Filed: Apr. 24, 1972

[21] Appl. No.: 246,953

Related U.S. Application Data

[63] Continuation of Ser. No. 350,684, March 10, 1964, abandoned, which is a continuation-in-part of Ser. Nos. 608,170, Sept. 8, 1956, abandoned, and Ser. No. 669,458, July 2, 1957, abandoned, and Ser. No. 26,707, May 4, 1960, abandoned.

[30] Foreign Application Priority Data

Sept. 7, 1955  Germany.................................. 18365
May 5, 1956   Germany.................................. 20224
June 12, 1956 Germany.................................. 20503
June 12, 1956 Germany.................................. 20504
July 2, 1956  Germany.................................. 20682

[52] U.S. Cl. ................................................ 424/247
[51] Int. Cl............................................... A61k 27/00
[58] Field of Search............................. 424/250, 247

[56] References Cited
UNITED STATES PATENTS 2,985,654   5/1961   Sherlock et al..................... 260/243
3,023,146   2/1962   Tislow et al. ...................... 424/247

*Primary Examiner*—Stanley J. Friedman
*Attorney, Agent, or Firm*—Burgess, Dinklage & Sprung

[57] ABSTRACT

This invention relates to and has as its object a novel phenothiazine derivative and its pharmacologically acceptable salts which have important therapeutic properties.

7 Claims, No Drawings

PHENOTHIAZINE DERIVATIVES IN THE TREATMENT OF PSYCHOTIC PERSONS

This is a continuation of application Ser. No. 350,684, filed Mar. 10, 1964, which in turn is a CIP of Ser. No. 608,170 of Sept. 8, 1956, No. 669,458 of July 2, 1957 and Ser. No. 26,707 of May 4, 1960, all now abandoned.

The new phenothiazine derivative of this invention is N-[γ-(4'-methylpiperazinyl-1')-propyl]-3-n-butyrylphenothiazine and can be represented by the following formula:

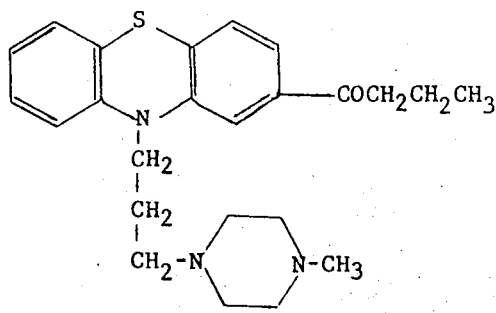

and includes the non-toxic - i.e., pharmacologically acceptable acid addition salts thereof.

The phenothiazine in accordance with the invention may be produced from the corresponding butyrylated phenothiazine of the formula:

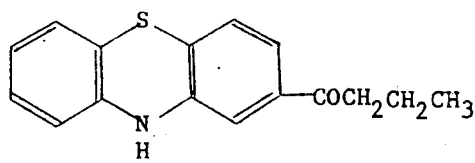

or from its corresponding derivative in which the carbonyl group is closed, by converting these butyrylated phenothiazines into their metal compounds, such as their sodium or potassium compounds and by reacting the latter with reactive esters of basic alcohols having the formula

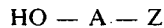
HO — A — Z in which A represents the propylene radical and Z is methylpiperazinyl.

Alternately, the metalization of the butyrylated phenothiazine or its functional derivative may be effected with the use of at least two equivalents of a useful metal donor and the basic alkylation may be effected with an equivalent amount of a salt of the reactive ester of the basic alcohol without the aid of an additional acid acceptor at elevated temperature with or without solvent and under pressure if necessary.

It is also possible to produce the phenothiazine derivative in accordance with the invention by reacting the butyrylated phenothiazine having the above-mentioned formula with the active esters of basic alcohols as set forth above without an additional acid liberating agent at elevated temperatures with or without solvents and possibly under pressure.

As an alternate method of producing the novel phenothiazine in accordance with the invention, the starting butyrylated phenothiazine having the above-designated formula or its functional derivative may be reacted with compounds of the acrylonitrile type or with reactive esters of alcohols which in place of the tertiary amino group have a substituent convertible into an amino group as, for example, a hydroxyl group or possibly a protected amino group, a halogen atom, or a carbonamide group and by effecting the conversion into the compound in accordance with the invention by resorting to conventional methods.

If a functional derivative of the butyrylated phenothiazine in which the carbonyl group is closed is employed, the blocking radical is split off again by conventional methods after completion of the basic alkylation.

Furthermore, the novel phenothiazine derivative in accordance with the invention may be prepared by heating the corresponding basic butyryl phenothiazine-10-carboxyl acid ester having the formula:

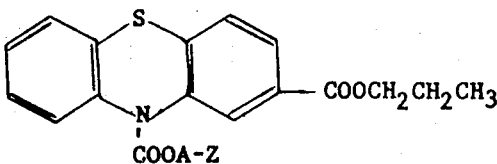

in which A and Z are as above defined to elevated temperatures between about 140° and 220° C., either as the free base or in the form of its salts with or without solvents and at normal pressure or under vacuum. Carbon dioxide is then split off and the basic alkylated butyryl phenothiazine in accordance with the invention is obtained in good yields.

The starting basic butyryl phenothiazine-10-carboxylic acid ester may be obtained by treatment of butyryl phenothiazine with phosgene and reaction of the intermediately formed butyryl phenothiazine-10-carboxyl acid chloride with a basic alcohol of the formula

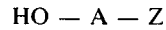
HO — A — Z in which A and Z are as given above.

One particular procedure involves reacting 2-butyryl-phenothiazine with sodamide in a suitable solvent as, for example, toluene, thereafter treating the reaction product with N-methyl piperazyl propyl chloride, following which the desired basic compound is isolated.

The preparation of the acid-addition salts of the butyryl phenothiazine in accordance with the invention may be effected in the conventional manner as, for example, by a simple acid base reaction carried out in an organic solvent.

Phenothiazine compounds have been extensively investigated for pharmacologically and clinically evaluating the same, and, in general, a substantial number have been found to possess a tranquillizing or sedative action, particularly on agitated psychotics. Moreover, a few of these compounds have demonstrated the ability not only to calm violent patients but to go still further in the direction of producing a catatonic or cataleptic state. In some circumstances, the latter may be a desirable property.

However, the ability to suppress agitation is not invariably desired or useful. It is recognized that there is a large reservoir of mentally ill persons who are not actively violent or agitated. In the case of frank schizophrenia, after a period of time the manifestations are likely to have moved through the agitated stage to a vegetative or catatonic stage. In this latter stage, one would not require or seek a tranquilizing or catatonic action in a drug. What is needed is a drug capable of arousing or awakening the patient from the withdrawn or catatonic state.

In accordance with the invention N-[γ-(4'-methylpiperazinyl-1')-propyl]-3-n-butyrylphenothiazine has been found to possess an unusual ability to arouse emotionally regressed patients as, for example, the acute and chronic schizophrenic. In addition to N-[γ-(4'-methylpiperazinyl-1')-propyl]-3-n-butyrylphenothiazine, the pharmaceutically-acceptable acid-addition salts are also contemplated as falling within the scope of the invention. Various acids may be used that will form acceptable non-toxic acid-addition salts at the therapeutic level, as for example, phosphoric, sulfuric, nitric, hydrochloric, hydrobromic, acetic, propionic, sorbic, glutaric, glutamic, adipic, aspartic, fumaric, maleic, succinic, glycolic, lactic, malic, tartaric, citric, ascorbic, benzoic, benzene sulfonic, phthalic, salicyclic, nicotinic or embonic acids. Instances of preferred salts are the dimaleate and the diphosphate.

The following Example more specifically teaches the process of preparation but it is to be understood that the Example is merely to be taken as illustrative and not limitative of the invention.

EXAMPLE

A solution of 74 g. of 3-butyryl-phenothiazine in 700 cc of toluene was boiled in the presence of 14 g. of sodamide for 3 hours. Subsequently, a solution of 50 g. of N-methylpiperazylpropyl chloride in 100 cc of toluene was instilled, followed by 4 – 5 hours of boiling and allowing to cool. The sodium chloride was filtered off by suction and the residue was thereafter washed with toluene and oxidized with dilute acetic acid. Following elution with ether, the resultant was alkalinized with caustic soda solution, extracted with ether and the ether solution dried over potash and evaporated. The residue was distilled in vacuo at 270° – 280° C/0.05 mm. There was obtained 54.9 g of N-[γ-(4'-methylpiperazinyl)-1')-propyl]-3-n-butyrylphenothiazine, which may also be designated 3-butyryl-10-(γ-N'-methylpiperazyl-N-propyl)-phenothiazine, the maleate of which had a melting point of 180° – 182° C.

The N'-methylpiperazyl-N-propyl chloride serving as reactant was prepared as follows, analogously to HROMATKA (Ber. 1942–131):

29 g of sodium was dissolved in 230 g of allyl alcohol, and after addition of 122 g of N-methylpiperazine, the solution was heated for 4 days to an external temperature of 120° – 130° C. The product was dissolved in dilute acetic acid and, after extraction of excess allyl alcohol with ether, supersaturated with potassium carbonate and extracted with ether. $Bp_3$: 105° C - Yield: 120 – 130 g.

96 g of methanesulfonic acid was instilled into a solution of 165.5 g of N'-methylpiperazylpropanol in 500 cc of chloroform, followed by heating to the boil. Now 175 cc of thionyl chloride was instilled and the mixture was boiled for 2 hours. The chloroform was distilled off under vacuum, the residue absorbed in water and the aqueous solution overlaid with ether and supersaturated with potassium carbonate at a temperature below 25° C. The ether solution was dried and distilled. $Bp_{0.05}$: 75° C - Yield: 161 g.

The ability of N-[γ-(4'-methylpiperazinyl-1')-propyl]-3-n-butyrylphenothiazine to act on the central nervous system was evaluated by the following tests using as a basis for comparison 3-chloro-10-(3-dimethylaminopropyl)phenothiazine, 3-chloro-10-[3-(4-methylpiperazinyl)propyl]phenothiazine, 3-acetyl-10-(3-dimethylaminopropyl) phenothiazine, and 3-propionyl-10-[3-(4-methylpiperazinyl)-propyl]phenothiazine.

1. Central Actions

A. Test on the "inclined plane":

Mice, who are placed at the bottom of a cloth-covered board which is set on an incline, have the tendency to climb to the upper edge. This behavior may be employed for the evaluation of sedative acting substances. By means of such substance the climbing tendency of the animal is more or less diminished. In this test, however, the effects on muscle strength and tone and catatonic action components which are present at the same time are also involved.

In the following the Effective Dose is given, that is, the dose which stops the climbing process in 50% of the animals.

|  | $ED_{50}$ |
|---|---|
| N-[γ-(4'-methylpiperazinyl-1')-propyl]-3-n-butyrylphenothiazine | 2.0 mg/kg sbc. |
| 3-chloro-10-[3-(4-methylpiperazinyl) propyl]phenothiazine | 6.5 mg/kg sbc. |
| 3-chloro-10-(3-dimethylamino propyl)-phenothiazine | 5.0 mg/kg sbc. |

B. Potentiation of narcosis:

A great number of the phenothiazine derivatives act to potentiate hypnotics, narcotics and analgesic drugs. For quantitative evaluation of the potentiating action the influence of the test substance on hexobarbital sodium narcosis in the mouse can be studied. For this purpose the phenothiazine derivative to be tested is introduced subcutaneously in a group of 10 mice, and after thirty minutes 100 mg. of hexobarbital sodium/kg is likewise introduced subcutaneously. Then the course of the narcosis is followed with determination of the narcotic stage according to Magnus-Girndt, as follows:

Stage I   slight ataxia on running.
Stage II   posture: portion of body lying on the side, head and anterior portion in normal position.
Stage III   anterior and posterior portions of body lying on the side, head in normal position.
Stage IV   lying on the side, including the head.
Stage V   slight narcosis, corneal and lid reflexes functional.
Stage VI   complete loss of reflexes.

Two criteria are employed for the evaluation of potentiating action:
1. depth of narcosis
2. prolongation of narcosis.

In the following is given the comparative values:

|  | Dosage | Depth | Prolongation |
|---|---|---|---|
| N-[γ-(4'-methylpiperazinyl-1')-propyl]-3-n-butyryl-phenothiazine | 10 mg/kg | to the 1st stage | for 1½–2 hours |
| 3-chloro-10-[3-(4-methylpiperazinyl) propyl]phenothiazine | 10 mg/kg | to the 1st stage | for 1½–2 hours |
| 3-chloro-10-(3-dimethylamino propyl)-phenothiazine | 10 mg/kg | to the 1½ stage | for 2 hours |

C. Anti-apomorphine action:

The phenothiazine derivatives have more or less an antiemetic action which may be evaluated in the dog with respect to the anti-apomorphine effect. The emetic drug is administered to the animals as apomorphine hydrochloride, subcutaneously, 0.1 mg/kg 30 minutes before the phenothiazine derivative is administered either subcutaneously or orally. In control experiments, that is, without using a phenothiazine derivative, repeated vomiting occurs after apomorphine.

|  | Complete Elimination of Emetic Action |
| --- | --- |
| N-[γ-(4'-methyl-piperazinyl-1')-propyl]-3-n-butyrylphenothiazine | 0.01 mg/kg subcutaneously |
| 3-chloro-10-[3-(4-methylpiperazinyl)propyl]phenothiazine | 0.5 mg/kg subcutaneously |
| 3-chloro-10-(3-dimethylaminopropyl)-phenothiazine | 0.5 mg/kg subcutaneously |
| 3-acetyl-10-(3-dimethylaminopropyl)phenothiazine | 1.0 mg/kg |
| 3-propionyl-10-[3-(4-methyl-piperazinyl)-propyl]phenothiazine | 0.1 mg/kg |

D. Effect on the arousal reaction in the unanesthetized dog:

In dogs in which electrodes have been implanted in the thalamus, hypothalamus, hippocampus, formatio reticularis and in the cortex, stimulation waves for arousal reaction were studied. There was observed following the intravenous injection of 5 mg/kg of N-[γ-(4'-methylpiperazinyl-1')-propyl]-3-n-butyryl-phenothiazine an enhancement of the stimulation waves, which was insignificant in comparison with the controls.

On the other hand, at the same dosage, 3-chloro-10-(3-dimethylaminopropyl)-phenothiazine under the same experimental conditions gave strongly elevated stimulation waves. The slight effect of N-[γ-(4'-methylpiperazinyl-1')-propyl]-3-n-butyrylphenothiazine on the arousal reaction is apparently a group property of the piperazine derivatives.

2. Predominantly Peripheral Actions

A. Effect on blood pressure:

In the anesthetized cat the measurement of the average blood pressure in the carotid may be accomplished with the aid of a mercury manometer. The initial pressure on the average was about 120 mm. of mercury. In each case equal volumes of different concentration solutions were injected within two minutes in the femoral vein.

In the following table the letters a, b, c, etc., each signifies one animal.

| Compound | Blood pressure lowering by mm. mercury after 0.05 mg/kg | 0.2 mg/kg | 0.5 mg/kg i.v. |
| --- | --- | --- | --- |
| N-[γ-(4'-methyl-piperazinyl-1')-propyl]-3-n-butyryl-phenothiazine | neg. variation | a) 30 b) 30 c) 15 | a) 30 b) 30 c) 20 |
| 3-chloro-10-[3-(4-methyl-piperazinyl)propyl]phenothiazine | 0 | a) neg. variation b) 0 | a) 30 b) 20 c) 50 |
| 3-chloro-10-(3-dimethylamino propyl)-phenothiazine | 20 | a) 60 b) 30 c) 40 d) 50 e) 30 | a) 90 b) 20 c) 60 |

B. Effect on the circulatory regulation mechanism in the dog:

Stationary studies in the dog give a certain insight into the circulatory regulatory mechanism (the unanesthetized dog is placed on a table). According to the Riva-Rocci-Principle, measurements of the systolic and diastolic blood pressure of the anterior tibial artery are made. Frequency is recorded with an EKG. If the animal is raised up such that only the hind feet remain on the table, then normally in the dog there occurs a brief increase in blood pressure (systolic and diastolic).

Under the influence of vasodepressant acting phenothiazine derivatives there can be observed in relationship to the dose the opposite reaction, up to collapse of pressure. From the following table it is evident that in the case of N-[γ-(4'-methylpiperazinyl-1')-propyl]-3-n-butyrylphenothiazine there is an especially slight orthostatic effect.

| Substance | Dosage in mg/kg i.v. | | | | |
| --- | --- | --- | --- | --- | --- |
|  | 0.1 | 1 | 3 | 5 | 10 |
| N-[γ-(4'-methyl-piperazinyl-1')propyl]-3-n-butyryl-phenothiazine |  | − | − | − | ± |
| 3-chloro-10-[3-(4-methylpiperazinyl)propyl]phenothiazine |  | − | + |  | + |
| 3-chloro-10-(3-dimethyl-aminopropyl)-phenothiazine |  | ± | + | + |  |
| 3-acetyl-10-(3-dimethylaminopropyl)phenothiazine | + | + |  |  |  |
| 3-propionyl-10-[3-(4-methylpiperazinyl)-propyl]phenothiazine |  | − | − | + |  |

+ orthostatic reaction present
± reaction doubtful
− no orthostatic reaction

C. Spasmolytic action:

In experimental procedure according to Magnus the spasmolytic action on contracture due to acetylcholine $(1:2 \cdot 10^6)$, by nicotine $(1:10^6)$ and by barium chloride $(1:10^4)$ was investigated on the isolated guinea pig intestine. As is seen from the following table the spasmolytic actions of the compounds are relatively slight:

|  | 50% inhibition of | | |
| --- | --- | --- | --- |
|  | acetylcholine contracture γ/liter | BaCl Contracture γ-liter | Nicotine contracture γ-liter |
| N-[γ-(4'-methyl-piperazinyl-1')propyl]-3-n-butyryl-phenothiazine | >10,000 | 2,800 | 5,300 |
| 3-chloro-10-[3-(4-methylpiperazinyl)propyl]-phenothiazine | 10,000 | 4,300 | 3,600 |
| 3-chloro-10-(3-dimethylamino propyl)-phenthiazine | 2,000 | 900 | 4,000 |

D. Antihistamine action:

This test is based on histamine-induced asthma in the guinea pig. In control experiments with inhalation of a spray of a 0.15% histamine dihydrochloride solution, 82% of the animals experienced severe asthmatic attacks within 1–3 minutes. The phenothiazine derivative to be tested was injected subcutaneously 30 minutes before inhalation. If the toxic symptoms remained absent for 10 minutes, then it was considered that there was complete protection, with allowance for 18% of the animals who reacted either not at all or only slightly to the histamine.

As may be seen from the following table the antihistamine action of N-[γ-(4'-methyl-piperazinyl-1')propyl]-3-n-butyryl-phenothiazine is relatively slight:

|  | $ED_{50}$ in mg/kg s.c. | Activity based on 10-(2-dimethylaminopropyl)phenothiazine |
|---|---|---|
| N-[γ-(4'-methyl-piperazinyl-1')propyl]-3-n-butyryl-phenothiazine | 1.0 | ca. 1/10 |
| 3-chloro-10-[3-(4-methylpiperazinyl)propyl]phenothiazine | 3.0 | 1/30 |
| 3-chloro-10-(3-dimethylamino propyl)-phenothiazine | 1.5 | 1/15 |
| 10-(2-dimethylaminopropyl) phenothiazine | 0.1 | 1 |

Summary

According to pharmacological experiments N-(γ-4'-methylpiperazinyl-1')-propyl]-3-n-butyrylphenothiazine represents a substance having a strong central action. Especially outstanding are the observed:

sedative-cataleptic action (inclined plane, mouse)
anti-apomorphine action (dog)

Also, the potentiating effect on barbiturate narcosis (mouse) is distinct.

In comparison to the piperazine phenothiazine derivatives tested, the antimetic action and the cataleptic effect of N-[γ-(4'-methylpiperazinyl-1')-propyl]-3-n-butyrylphenothiazine stands out in a characteristic manner.

The study of the arousal reaction in the EEG of the unanesthetized dog N-[γ-(4'-methylpiperazinyl-1')-propyl]-3-n-butyrylphenothiazine is shown to be a typical member of the strong acting piperazine derivatives of the phenothiazines.

In the preponderantly peripheral tests the slight effect of N-[γ-(4'-methylpiperazinyl-1')-propyl]-3-n-butyrylphenothiazine on the autonomic nervous system is demonstrated. It is noteworthy that is possesses a relatively slight vasodepressive activity. Outstanding is the good compatibility in the stationary studies of the unanesthetized dog. This study serves for experimental measurements of the circulatory behavior, which has an especially good parallel in the human.

3. Further Studies

EEG studies have been instituted in a small number of cats to further define the activity of N-[γ-(4'-methylpiperazinyl-1')-propyl]-3-n-butyrylphenothiazine. In general, the frequencies of the waves have been slowed, and splinding occurred following a dose of 6 mg/kg of the compound. There was no further change in the frequency or pattern of the waves until a total dose of 50 mg/kg has been given. Following administration of this amount of the compound, the cortex became isoelectric and the heart rate was slowed, suggesting cardiovascular collapse. Apparently, this compound does not produce convulsions when given in high doses as does 3-chloro-10-(3-dimethylaminopropyl)-phenothiazine. Electrical changes in the limbic systems have not yet been investigated, and an adequate comparison to the action of 3-chloro-10-(3-dimethylaminopropyl)-phenothiazine cannot be made at this time. Using the cortical after-discharge technique, N-[γ-(4-methylpiperazinyl-1')-propyl]-3-n-butyrylphenothiazine was shown to have weak, if any, anticonvulsant action. One mg/kg of the compound reduced the cortical after-discharge by about 50 percent for a short time. Higher doses abolished the after-discharge for about 5 minutes; and usually it had returned within 10 minutes. Doses from 5 to 20 mg/kg produced the same effect on the after-discharge. This action differs somewhat from the action of some other phenothiazines and reserpine. The latter drugs usually prolong the after-discharge rather than shorten it. Like other major tranquilizers, this compound produces sedation and does not exert an anticonvulsant effect.

A. N-[γ-(4'-methylpiperazinyl-1')-propyl]-3-n-butyrylphenothiazine dimaleate was administered orally to 24 dogs 6 days per week in dosages of 27, 9.0, or 3.0 mg/kg/day. Two hundred rats received dosages of 30, 10, or 3.3 mg/kg/day.

The following observations and/or examinations were made: growth, food consumption, survival, behavior, hemograms, blood urea nitrogen, serum glutamic oxaloacetic transaminase, serum glutamic pyruvic transaminase, serum alkaline phosphatase, BSP qualitative urinalysis in the dogs, organ weights and both gross and microscopic pathology.

Based on the above observations, no signs of toxicity were seen in the dogs. Slight to marked pharmacological signs (proportional to dose) consisting of sedation, pupillary constriction, relaxation of the nictitating membrane, and dryness of mucous membranes were noted in the dogs. No signs of toxicity were observed in the rats except for decreased growth rate in the high level males; and an increased thyroid weight in the high level females that were autopsied at 14 to 15 weeks. A rather curious increase in growth rate as compared with the controls was noted in the middle level female rats.

The tissues were evaluated independently by four pathologists, and the consensus was that no pathological lesions of a general nature were present in the material submitted. It was the opinion that the test substance did not produce any pathological lesions which could be detected by light microscopy.

B. Chronic oral 12 month toxicity study in rats:

The oral administration of N-[γ-(4'-methylpiperazinyl-1')-propyl]-3-n-butyrylphenothiazine dimaleate to groups of 50 rats at dosage levels of 30, 10, or 3.3 mg/kg for 52 weeks resulted in the following:

1. A depression in the weight gain of the male rats receiving 30 mg/kg; a better than control weight gain in the females receiving 10 mg/kg; and in both the males and females receiving 3.3 mg/kg.

2. A transient decrease in white cells and a lymphopenia in the high level male rats at the forty-third week interval. All rats were within control parameters at the fifty-second week interval.
3. At the interim autopsies a slightly increased thyroid weight in the high level female rats was reported. This was not observed in the rats at termination. A slightly depressed adrenal weight which was observed in the 30 and 10 mg/kg females at the interim sacrifices was not observed at termination.

In clinical studies 1. N-[γ-(4'-methylpiperazinyl-1')-propyl]-3-n-butyrylphenothiazine was compared with the following compounds as to effectiveness in schizophrenic psychoses:

| | | |
|---|---|---|
| 2. | Chlorpromazine | 3-chloro-10-(3'-dimethylaminopropyl)-phenothiazine |
| 3. | Triflupromazine | 3-trifluormethyl-10-(3'-dimethylaminopropyl)-phenothiazine |
| 4. | Levomepromazine | 3-methoxy-10-(3'-dimethylamino-2'-methylpropyl)-phenothiazine |
| 5 | Thipendyl | N-(3-dimethylaminopropyl)-thiophenylpyridylamine |
| 6. | Chlorprothixene | 2-chloro-9-(3'-dimethylaminopropylidene)-thiaxanthene |
| 7. | Thioridazine | 3-methylmercapto-10-[β-N-methyl-2'-piperidyl-ethyl]-phenothiazine |
| 8. | Perazine | N-methyl-piperazinyl-N'-propylphenothiazine |
| 9. | Perphenazine | 3-chloro-10-(3'-[1''-hydroxyethyl-4''-piperazinyl]-propyl)-phenothiazine |
| 10. | Prochlorperazine | 3-chloro-10-[3'-4''-methylpiperazinyl)-propyl]-phenothiazine |
| 11. | Haloperidol | 1-(3'-p-fluorbenzoylpropyl)-4-hydroxy-4-p-chlorophenylpiperidine |
| 12. | Tetrabenazine | 9,10-dimethoxy-3-isobutyl-1,2,3,4,6,7-hexadio-11bH-benzo [a] chinolizine-2-one |
| 13. | Imipramine | 5-(3'-dimethylaminopropyl)-10,11-dihydro-5-H-dibenz[b,f]azepine hydrochloride |
| 14. | Iproniazide | isonicotinic acid-2-isopropyl hydrazide |
| 15. | Isocorboxazide | 1-benzyl-2-(5'-methyl-3'-isoxazolyl-carbonyl) hydrazine |
| 16. | Nialamide | N-isonicotinoyl-N'-[β-(N-benzylcarboxamido)-ethyl] hydrazine |
| 17. | Phenelzine | β-phenylethyl hydrazine dihydrogen sulfate |
| 18. | Pheniprazine | β-phenylisopropyl hydrazine |

The results of the comparison are shown in the following table:

TABLE I

Therapeutic effects of new psychotropic compounds in schizophrenic psychoses

| | Excitation | Stupor | Illusion symptomatology* | Hallucinations | Formal mental disturb. (confusion,brkg. off thoughts; loss of thoughts; diffused thinking | Unrealization | Foreign influenced exp. | Autism | Defective symptoms (emotional depletion;loss motivation; strg.manners and appearance | Clinical | Daily dose in mg. | Ambulant |
|---|---|---|---|---|---|---|---|---|---|---|---|---|
| 1 | ++ | + | +++ | +++ | ++ | ++ | ++ | + | (+) | | 20– 40 | 5– 15 |
| 2 | +++ | + | ++ | ++ | ++ | + | ++ | + | (+) | | 200–400 | 50–200 |
| 3 | ++ | + | ++ | ++ | ++ | + | ++ | + | (+) | | 50–150 | 10– 50 |
| 4 | ++ | + | ++ | ++ | ++ | + | ++ | + | (+) | | 50–150 | 10– 50 |
| 5 | +++ | 0 | ++ | + | ++ | + | + | + | (+) | | 100–300 | 50– 75 |
| 6 | + | 0 | ++ | ++ | ++ | + | ++ | + | (+) | | 200–400 | 80–200 |
| 7 | +++ | 0 | ++ | ++ | ++ | + | + | + | (+) | | 200–400 | 50–150 |
| 8 | + | 0 | + | + | + | + | + | + | (+) | | 100–500 | 100–200 |
| 9 | ++ | + | +++ | +++ | ++ | ++ | ++ | + | (+) | | 200–500 | 50–150 |
| 10 | ++ | + | +++ | +++ | ++ | ++ | ++ | + | (+) | | 20– 70 | 10– 30 |
| 11 | + | + | +++ | +++ | ++ | ++ | ++ | + | (+) | | 80–150 | 20– 30 |
| 12 | +++ | 0 | +++ | +++ | ++ | + | + | + | (+) | | 0.5– 15 | 2– 5 |
| 13 | ++ | 0 | ++ | +++ | + | + | + | ++ | (+) | | 60–150 | 30– 50 |
| 14 | – | + | – | – | 0 | 0 | 0 | (+) | (+) | | 100–250 | 50–100 |
| 15 | – | + | – | – | 0 | 0 | 0 | (+) | (+) | | 100–150 | 25–150 |
| 16 | – | + | – | – | 0 | 0 | 0 | (+) | (+) | | 30– 50 | 20– 40 |
| 17 | – | + | – | – | 0 | 0 | 0 | (+) | (+) | | 100–200 | 50–100 |
| 18 | – | + | – | – | 0 | 0 | 0 | (+) | (+) | | 30– 60 | 15– 30 |
| 19 | – | + | – | – | 0 | 0 | 0 | (+) | (+) | | 3– 12 | 3– 6 |

+++ very good,
++ good,
+ moderately good,
(+) uncertain,
0 no apparent therapeutic effect,
– worsening
*The systematic, fixed illusion of the nature of paranoia can be excluded; psychopharmacologically it can scarcely be influenced.

The physical side effects of the compound in accordance with the invention observed in connection with the above study are shown in Table II.

The extrapyramidal motor action component clinically occurs in a much more rapid tempo than in the case with conventional neuroleptics. A parallelism to TABLE II
Physical side-effects (Table rotated; patients numbered 1–19 across columns; side effects listed as rows. Symbols: 0 = none; + = infrequent; ++ = occasionally; +++ = frequently.)

this increase in tempo with regard to the appearance of the mentioned phenomena is the more rapid influence upon the psychoses. In many paranoid-hallucinatory patients disappearance of the hallucinations, diminution of imaginary experiences, separation of paranoid concepts and even a complete disappearance of the schizophrenic personality were observed after a few days of treatment. Furthermore, patients showed a clear insight into the abnormality of the previous condition.

The extrapyramidal motor manifestations can be limited significantly in frequency and intensity without influencing the therapeutic effect when concomitant antiparkinson drugs such as Akineton*, Aturban, Artane*, amd Cogentin**** are used. Until now, all compounds which have been found effective for schizophrenia possess a tendency for the release of differently constituted extra-pyramidal phenomena.

*α-bicyclo[2.2.1]-hept-5-en-2-yl-α-phenyl-1-piperidinopropanol
**
***α-cyclohexyl-α-phenyl-1-piperidinepropanol
****tropane methane sulfonate In another study, the effect of N-[γ-(4'-methylpiperazinyl-1')-propyl]-3-n-butyrylphenothiazine in 52 female schizophrenic patients, 42 of whom had chronic disease and 100 acute disease was evaluated.

The results showed that in the 10 acute schizophrenic patients 4 achieved "excellent" results, 4 "very good," 1 "good," and 1 "failure." Of the 42 chronic patients the results in 16 were "excellent," 12 "very good," 10 "good" and 4 were "failures." Side effects of an extrapyramidal character were seen often and were of an akinetic-hypertonic or akathisia form, and described as very slight to very strong. Such reactions were seen at 5 mg. or more daily with a maximum of 15 mg. administered. For every 2.5 mg. of N-[γ-(4'-methylpiperazinyl-1')-propyl]-3-n-butyrylphenothiazine, either Artane 2 mg. or Akineton 200 mg. was given concomitantly. Side effects occurred after 5 – 7 days of treatment. Other side effects were not noted although isolated patients complained of fatigue. Liver and kidney tests were unchanged. Improvement in psychoses usually occurred after 10 days, first with stabilization, tempering of inner tensions, better contact, while definite remissions usually took place about the 20th day. By this time there was a disappearance of hallucinations and partial or even complete disappearance of paranoid ideas.

In still another series the therapeutic effect of N-[γ-(4'-methylpiperazinyl-1')-propyl]-3-n-butyrylphenothiazine was evaluated with the especial consideration of extrapyramidal symptoms.

Two groups of chronic schizophrenic patients (34 patients) were treated with N-[γ-(4'-methylpiperazinyl-1')-propyl]-3-n-butyrylphenothiazine and daily examined according to the method of Haase. Amazing therapeutic success could not be expected because we were dealing with severe cases which had been ill for a long time. Reduced psychomotor activity was influenced very favorably; the walking, speaking and functional activity was increased in many patients. Simultaneously, the autistic behavior changed.

Thioproperazine (3-dimethylsulfamido-10-[3'-(4''-methylpiperazinyl)propyl] phenothiazine) is an instance of an active neuroleptic; however, it also is much more difficult to use therapeutically. N-[γ-(4'-methylpiperazinyl-1')-propyl]-3-n-butyryl- phenothiazine acts especially intensively in paranoid hallucinatory forms of schizophrenia. In contrast to the neuroleptics of the promazine group, such as chlorpromazine*, triflupromazine** and the like, the initial sedation is absent. Besides this, the burden on circulation is very slight for this product so that orthostatic disturbances of circulatory reaction do not occur. During treatment only extrapyramidal motor hyperkinetic side effects have to be considered. At a gradually increasing dose and a daily dose of 15 – 30 mg.; extrapyramidal motor side effects are relatively slight. They can further be decreased by the addition of antiparkinson drugs. If the fine motor appearances are examined systematically and the dose adjusted to them, the hyperkinesias can be avoided almost entirely. The investigations show that doses of 15 mg./day are sufficient in most cases.

*3-dimethylaminopropyl)-phenothiazine
**2-(trifluoromethyl) phenothiazine

In all, the following has been observed with respect to dosage.

Strict individualization of dosage is a necessity. In general, 30 – 60 mg. per day seem to suffice for most schizophrenic patients. However, as mentioned above, in at least two investigations, doses as low as 10 – 20 mg./day have seemed optimum. Since N-[γ-(4'-methylpiperazinyl-1')-propyl]-3-n-butyrylpenothiazine has been given with impunity in doses up to 300 mg., considerable latitude can be exercised by the prescribing physician if patient symptomotology warrants a trial at a higher dosage level. For the psychoneurotic individual and the elderly patient with chronic brain syndrome, it is suggested that doses below 15 mg./day be used. Very frequently 1 mg. t.i.d. will suffice.

When giving the parenteral form of the drug, deep intramuscular injections should be utilized, with 5 mg. being the uppermost dosage employed. It is desirable for the patient to remain in a recumbent position for several minutes following parenteral administration.

N-[γ-(4'-methylpiperazinyl-1')-propyl]-3-n-butyrylphenothiazine is preferably employed as the dimaleate salt in capsules containing 1.0 mg., 5.0 mg., 10 mg. and 25.0 mg., and as the diphosphate salt in liquid pints containing 5 mg./teaspoon and in 5 cc. ampules containing 5 mg./cc. for intramuscular use.

As indicated above, the compounds of the present invention (free base and salts thereof) are useful for the treatment of psychoses perorally, and for this purpose the active compounds may be associated with a pharmacologically-acceptable filler or carrier material. The active compound may be administered perorally in liquid or solid dosage forms, including capsules, tablets, powders, pills, and the like, and may include flavored suspensions and solutions of either an aqueous or oil base.

As oil base, there may be included, for instance, such edible oils as corn oil, cotton-seed oil, coconut oil, peanut oil, sesame oil, mixtures of these, and the like. On the other hand, for the preparation of such compositions as tablets and other compressed formulations, the compositions may include any compatible and edible tabletting materials used in the pharmaceutical practice, such as corn starch, lactose, stearic acid, magnesium stearate, talc, methyl cellulose, and the like.

For administration via the parenteral route, a liquid carrier is required. Such carrier must be pharmacologically inert and satisfactory to maintain the active component either in the form of a solution or a very fine dispersion. The salts are soluble in water and, accordingly, the same represents the most satisfactory vehicle for use as carriers. Oils such as, for example, peanut oil, sesame oil, etc., may similarly be used.

It is, of course, absolutely necessary that the resulting solution or dispersion not undergo deterioration or other undesirable changes on sterilization thereof.

The methods of preparation of the therapeutic compositions containing N-[γ-(4'-methylpiperazinyl-1')-propyl]-3-n-butyrylphenothiazine are the conventional methods employed for similar purposes.

We claim:

1. The method of treating a psychotic person who exhibits regression predominantly characterized by symptoms of withdrawal and apathy when said person is in a withdrawn or catatonic state to arouse or awaken said person which comprises administering to said person a therapeutic composition containing a compound of the class consisting of a free base and salts thereof with pharmaceutically acceptable acids, said free base having the formula

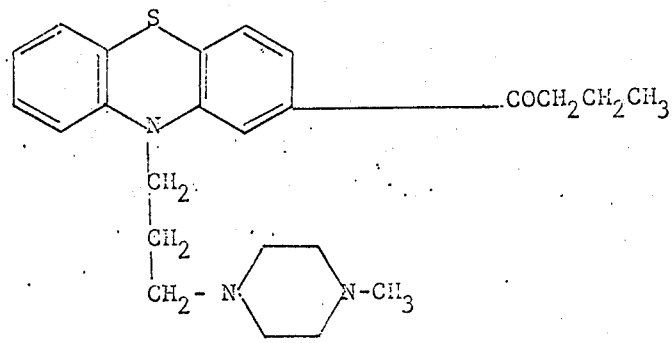

combined with a carrier therefor.

2. Method according to claim 1, wherein the active compound is in the form of a non-toxic acid addition salt and the carrier comprises an aqueous vehicle.

3. Method according to claim 2, wherein said active compound is present in an amount from about 5 to 25 mg. per dosage unit.

4. Method according to claim 3, wherein the active compound is in the form of the diphosphate salt.

5. Method according to claim 1, wherein the composition comprises a solid excipient carrier.

6. Method according to claim 5, wherein the active compound is present in an amount of from 5 to 25 mg.

7. Method according to claim 6, wherein the active compound is present in the form of the dimaleate salt.

* * * * *

CERTIFICATE OF CORRECTION

Patent No. 3,885,034　　　　　　Dated May 20, 1975

Inventor(s) KLAUS HEINZ RISSE, ULRICH HÖRLEIN, WOLFGANG WIRTH

It is certified that error appears in the above-identified patent and that said Letters Patent are hereby corrected as shown below:

Column 7, line 47, change "antimetic" to -- antiemetic --;
　　　　　line 59, change "is possesses" to -- it possesses --.
Column 8, line 1, change "splinding" to -- spindling --.
Column 10, Table I, last column, item 11, change "20-30" to -- 20-80 --.
Column 13, line 20, after the double asterisk (**) insert -- 2-(2-diethylaminoethyl)-phenylglutarimide --;
　　　　　line 22, after the quadruple asterisk (****) and before "tropane" insert -- 3-diphenylmethoxy --.
Column 14, line 8, delete the semi-colon (;) after "mg." and insert therefor a comma (,);
　　　　　line 15, change "3-dimethylaminopropyl)-phenothiazine" to -- 3-chloro-10-(3-dimethylaminopropyl)-phenothiazine --;
　　　　　line 16, change "2-(trifluoromethyl) phenothiazine" to -- 10-(3-Dimethylaminopropyl)-2-(trifluoromethyl) phenothiazine --.

Signed and Sealed this twenty-third Day of September 1975

[SEAL]

Attest:

RUTH C. MASON
Attesting Officer

C. MARSHALL DANN
Commissioner of Patents and Trademarks